United States Patent
Huang

(10) Patent No.: US 8,449,286 B2
(45) Date of Patent: May 28, 2013

(54) INJECTION MOLDING MACHINE

(75) Inventor: Chien-Feng Huang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 278 days.

(21) Appl. No.: 12/973,932

(22) Filed: Dec. 21, 2010

(65) Prior Publication Data
US 2012/0076890 A1   Mar. 29, 2012

(30) Foreign Application Priority Data

Sep. 23, 2010   (TW) .................................. 99132188

(51) Int. Cl.
B29C 45/40   (2006.01)
(52) U.S. Cl.
USPC .......................................... 425/556; 425/577
(58) Field of Classification Search
USPC .................... 425/556, 577; 264/334
See application file for complete search history.

(56) References Cited

U.S. PATENT DOCUMENTS

| | | | | |
|---|---|---|---|---|
| 5,196,213 A * | 3/1993 | Watanabe et al. | ............. | 425/556 |
| 5,310,331 A * | 5/1994 | Wakebe et al. | ............... | 425/139 |
| 5,648,103 A * | 7/1997 | Takanohashi | ................. | 425/107 |
| 6,109,904 A * | 8/2000 | Hehl | ............................. | 425/190 |
| 6,113,376 A * | 9/2000 | Eppich | .......................... | 425/190 |
| 6,679,698 B2 * | 1/2004 | Abe et al. | ....................... | 425/153 |
| 6,837,701 B2 * | 1/2005 | Becker et al. | ................. | 425/556 |
| 7,157,037 B2 * | 1/2007 | Seidelman et al. | ........... | 264/318 |
| 7,275,922 B2 * | 10/2007 | Uchiyama et al. | ............ | 425/139 |
| 8,297,967 B2 * | 10/2012 | Huang | ........................... | 425/556 |
| 2002/0098259 A1 * | 7/2002 | Vandenberg | ................... | 425/556 |
| 2003/0189274 A1 * | 10/2003 | Graham et al. | ................ | 264/318 |
| 2011/0064843 A1 * | 3/2011 | Eppich | .......................... | 425/556 |
| 2011/0229596 A1 * | 9/2011 | Huang | ........................... | 425/556 |
| 2011/0256259 A1 * | 10/2011 | Chen | ............................. | 425/556 |

FOREIGN PATENT DOCUMENTS

| | | | | |
|---|---|---|---|---|
| JP | 02003291185 A | * | 10/2003 | |
| JP | 02005329662 A | * | 12/2005 | |
| JP | 02009143028 A | * | 7/2009 | |
| JP | 02010240676 A | * | 10/2010 | |
| JP | 02011051216 A | * | 3/2011 | |

* cited by examiner

*Primary Examiner* — Yogendra Gupta
*Assistant Examiner* — Emmanuel S Luk
(74) *Attorney, Agent, or Firm* — Altis Law Group, Inc.

(57) ABSTRACT

An injection molding machine includes a moving platen. The moving platen includes a fixed support and an ejector assembly. The fixed support includes a first and a second adjustment motors, and a first and a second adjustment shafts. The first and second adjustment motors are connected to the first and second adjustment shafts respectively. The ejector assembly includes two guide shells, two drive shafts, two ejector pins, and two guide protrusions. Each guide shell is positioned in the fixed support and receives one drive shaft and one ejector pin. Each drive shaft engages with a corresponding ejector pin and is capable of driving the corresponding ejector pin to move back and forth in the guide shell. Each guide protrusion extends outwards from a corresponding guide shell. Each of the first and second adjustment shafts engages with a corresponding guide protrusion and is capable of moving the corresponding guide protrusion.

19 Claims, 5 Drawing Sheets

INJECTION MOLDING MACHINE

BACKGROUND

1. Technical Field

The disclosure generally relates to injection molding, and particularly to an injection molding machine.

2. Description of the Related Art

Normally, only one mold is arranged to complete one set of moldings in a cycle of an injection molding machine. For increased efficiency of the injection molding machine, therefore, there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references mean at least one.

Figure 1:
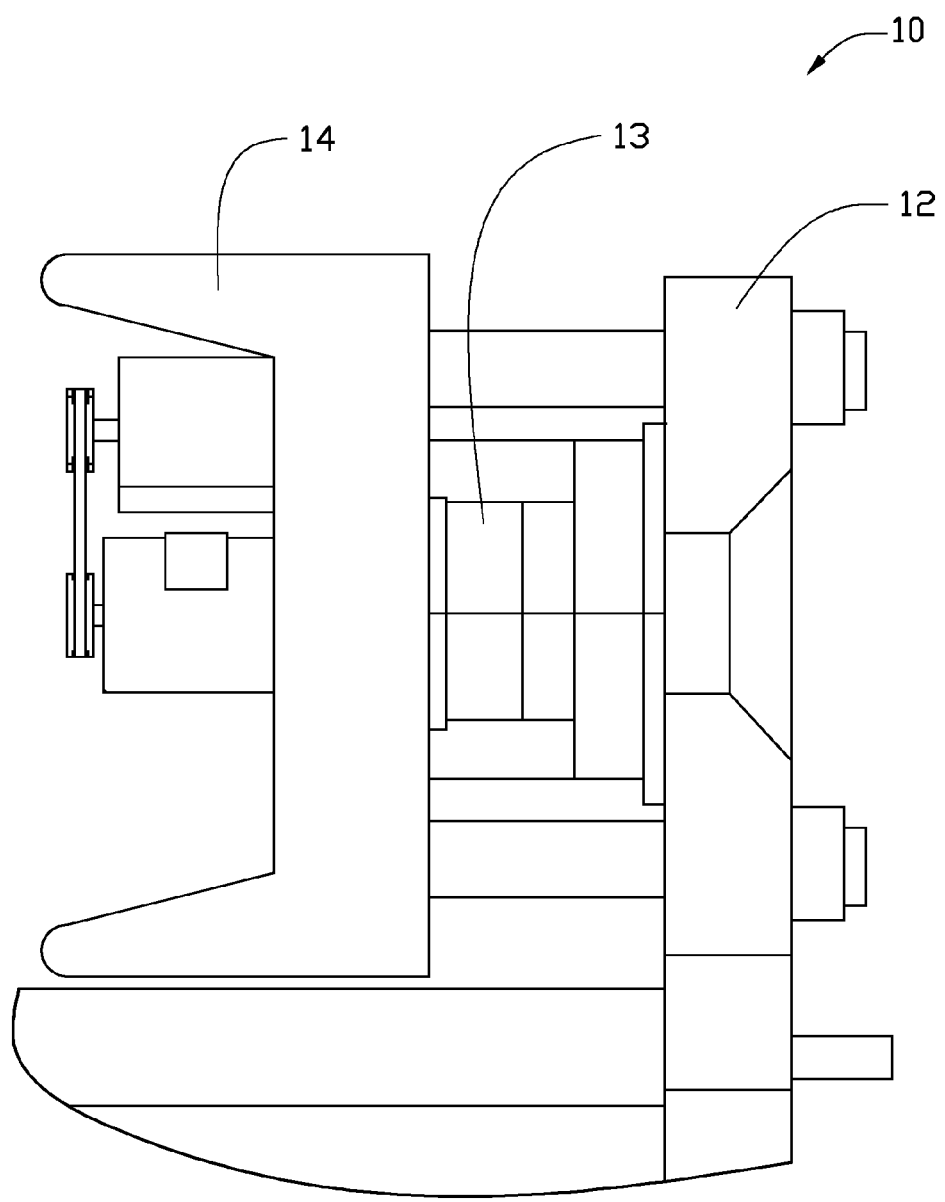
FIG. 1 is a schematic view of an injection machine in accordance with one embodiment of the disclosure.
Figure 2:
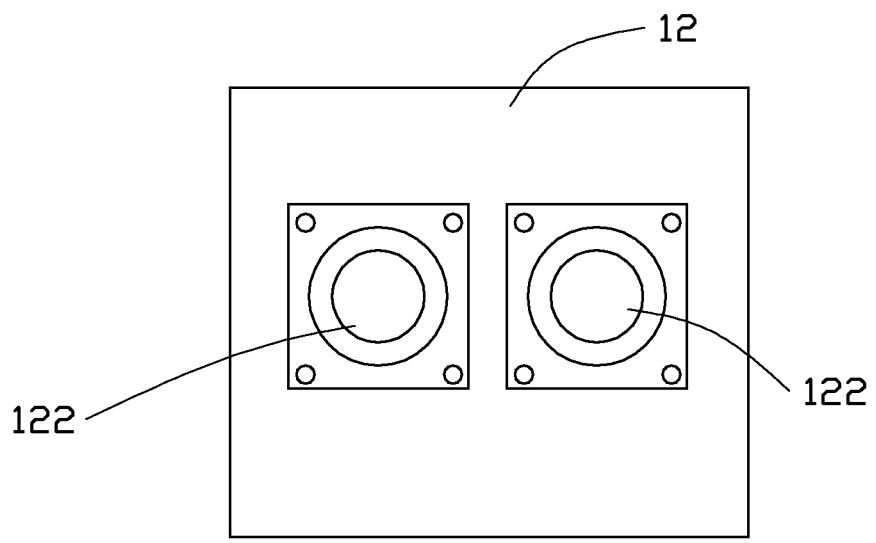
FIG. 2 is a schematic view of a fixed platen of the injection molding machine in FIG. 1.

Referring to FIGS. 1-2, an injection molding machine 10 includes a fixed platen 12, molds 13 and a moving platen 14. The fixed platen 12 includes two nozzles 122. Molten resin is filled in the molds 13 arranged between the fixed platen 12 and the moving platen 14 through the nozzles 122.

Figure 3:
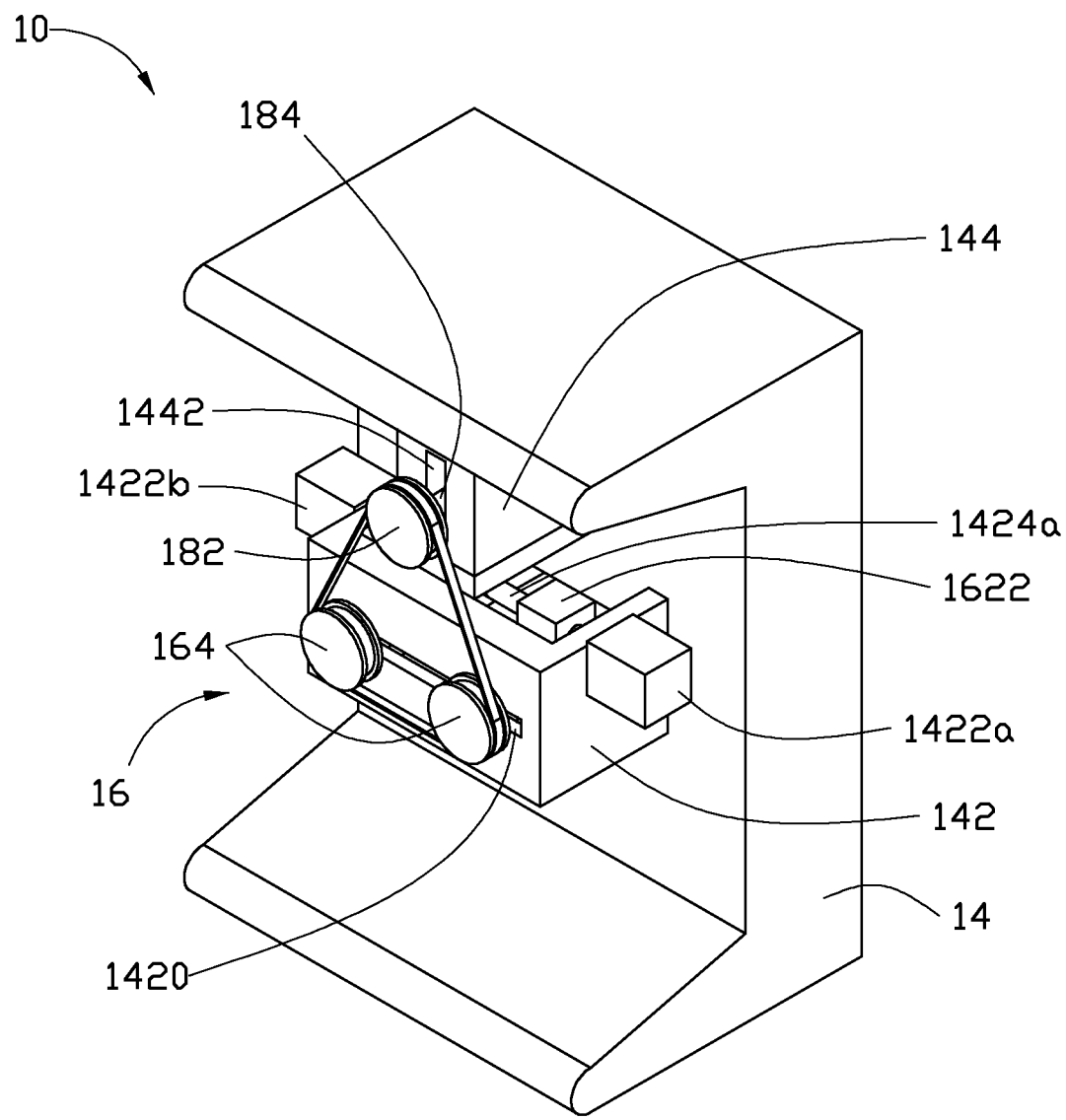
FIG. 3 is an isometric view of a moving platen of the injection molding machine in FIG. 1.
Figure 4:
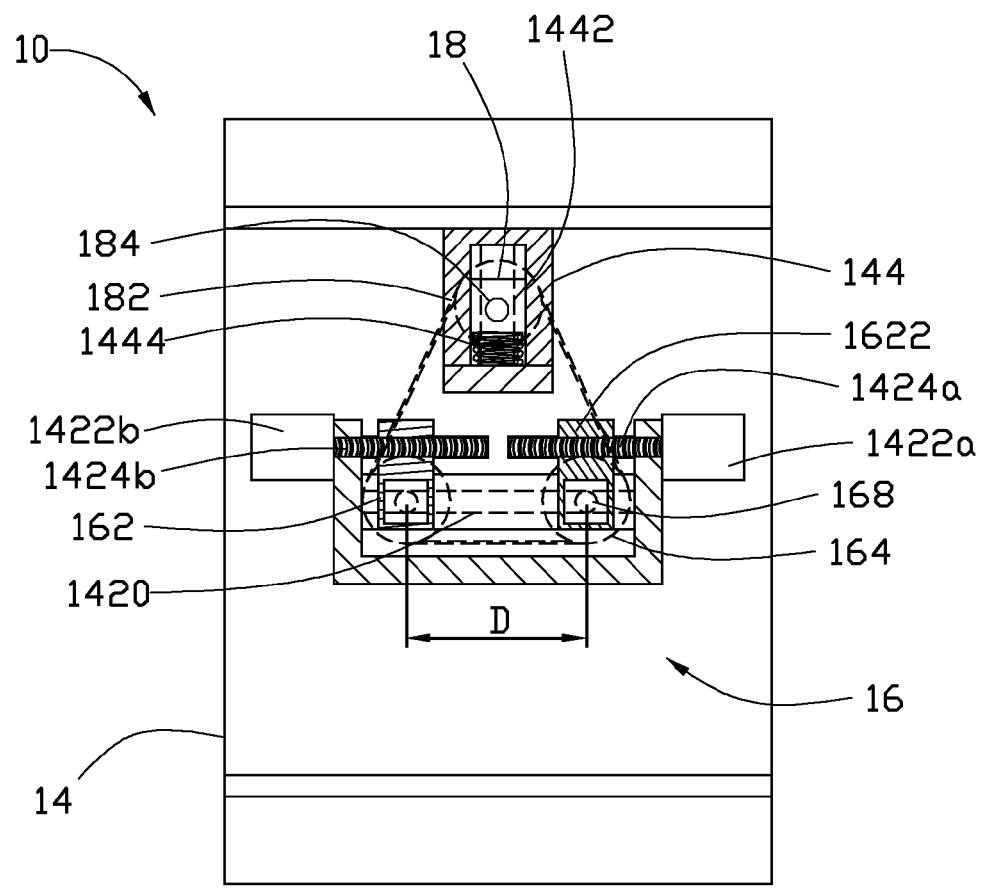
FIG. 4 is a cutaway view of the moving platen of FIG. 3.
Figure 5:
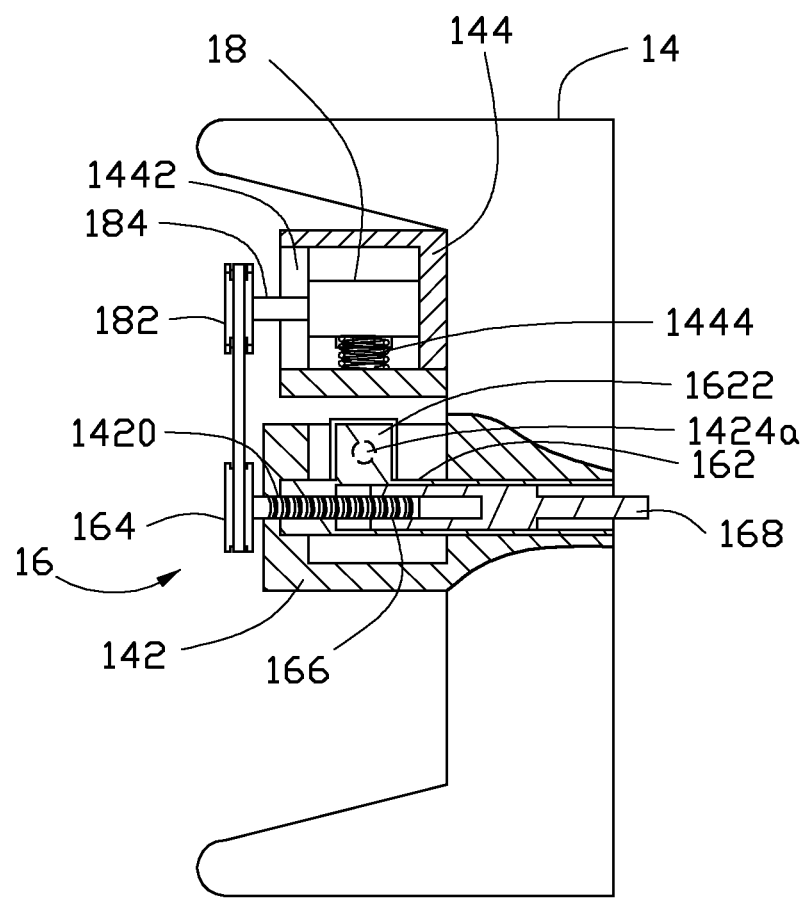
FIG. 5 is another cutaway view of the moving platen of FIG. 3.

Referring to FIGS. 3-5, the moving platen 14 includes a fixed support 142, a drive apparatus 144 and an ejector assembly 16.

The fixed support 142 is mounted on one side surface of the moving platen 14. A strip-shaped opening 1420 is defined in one surface of the fixed support 142.

The fixed support 142 includes a first adjustment motor 1422a, a second adjustment motor 1422b, a first adjustment shaft 1424a and a second adjustment shaft 1424b. The first adjustment motor 1422a and the second adjustment motor 1422b are mounted on two sides of the fixed support 142. The first adjustment motor 1422a is opposite to the second adjustment motor 1422b.

The ejector assembly 16 includes two guide shells 162, two first pulleys 164, two drive shafts 166, two ejector pins 168 and two guide protrusions 1622.

The guide shells 162 pass through the moving platen 14. Each of the guide shell 162 receives each drive shaft 166 and each ejector pin 168. Each ejector pin 168 has a plurality of internal screw threads. Each drive shaft 166 passes through the opening 1420. One end of the drive shaft 166 has a plurality of external screw threads engaging with the internal screw threads of a corresponding ejector pin 168, and the other end of the drive shaft 166 is connected to a corresponding one of the first pulleys 164.

Each guide protrusion 162 extends outwards from a corresponding one of the guide shells 162. The first adjustment shaft 1424a and the second adjustment shaft 1424b pass through the guide protrusions 1622 respectively. Each of the first and second adjustment shafts 1424a, 1424b has a plurality of external screw threads. Each guide protrusion 1622 has a plurality of internal screw threads. The first adjustment motor 1422a can move a corresponding one of the guide shells 162 through the thread engagement of the first adjustment shaft 1424a with one guide protrusion 1622 engaged with the first adjustment shaft 1424a. The second adjustment motor 1422b can move the other of the guide shells 162 through the thread engagement of the second adjustment shaft 1424b with the other guide protrusion 1622 engaged with the second adjustment shaft 1424b. As a result, the drive shafts 166 and the ejector pins 168 can be moved along the strip-shaped opening 1420 by the first and second motors 1422a, 1422b.

The drive apparatus 144 includes a servo motor 18 and a spring 1444. The spring 1444 is defined below the servo motor 18 for adjusting the position thereof. A hole 1442 is defined in the drive apparatus 144. The servo motor 18 includes a second pulley 182 and a drive rod 184. The drive rod 184 passes through the hole 1442. The second pulley 182 is mounted on the drive rod 184 of the servo motor 18. The servo motor 18 can move up and down along the hole 1442.

The two first pulleys 164 and the second pulley 182 are connected through a belt (not labeled). When the second pulley 182 rotates, the two first pulleys 164 and the drive shafts 166 can rotate synchronously through the belt. Each of the ejector pins 168 moves back and forth along each guide shell 162 through the thread engagement of the ejector pin 168 with a corresponding drive shaft 166 engaged with the ejector pin 168. When a distance D between the two ejector pins 168 is adjusted by the first and second adjustment motors 1422a, 1422b, the position of the servo motor 18 is adjusted by the spring 1444.

In operation, two molds of different sizes can be arranged in the injection molding machine 10 utilizing the ejector assembly 16 as disclosed. Accordingly, efficiency of the injection molding machine 10 is improved.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An injection molding machine comprising a moving platen, the moving platen comprising:

a fixed support defining an opening in one surface thereof and comprising a first adjustment motor, a second adjustment motor, a first adjustment shaft, and a second adjustment shaft, the first and second adjustment motors opposite to each other, the first adjustment motor connected to the first adjustment shaft, the second adjustment motor connected to the second adjustment shaft; and an ejector assembly comprising two guide shells, two drive shafts, two ejector pins, and two guide protrusions, each guide shell positioned in the fixed support and receiving a corresponding drive shaft and a corresponding ejector pin, each drive shaft passing through the opening, engaging with a corresponding ejector pin and capable of driving the corresponding ejector pin to move back and forth in the guide shell, each guide protrusion extending outwards from a corresponding guide shell, each of the first and second adjustment shafts engaging with a corresponding guide protrusion and capable of driving the corresponding guide protrusion to move along the opening.

2. The injection molding machine of claim 1, further comprising a fixed platen, the fixed platen and the moving platen configured to cooperatively position molds, the fixed platen comprising two nozzles for filling molten materials in the molds.

3. The injection molding machine of claim 1, wherein the moving platen comprises a drive apparatus, the drive apparatus comprises a motor and a position adjustment unit, and the position adjustment unit is configured for supporting the motor and adjusting a position of the motor according to the positions of the two ejector pins.

4. The injection molding machine of claim 3, wherein the ejector assembly further comprises two first pulleys, the motor of the drive apparatus comprises a second pulley and a drive rod, the first pulleys are mounted on the drive shafts respectively, the drive rod is connected to the motor, the second pulley is mounted on the drive rod, and the first and second pulleys are connected to each other through a belt.

5. The injection molding machine of claim 4, wherein each ejector pin has a plurality of internal screw threads, one end of each drive shaft extends out of the fixed support through the opening and is connected to a corresponding first pulley, the other end of each drive shaft has a plurality of external screw threads engaging with the internal screw threads of a corresponding ejector pin, and the drive shaft is capable of being rotated by the motor to drive the corresponding ejector pin to move back and forth.

6. The injection molding machine of claim 5, wherein the drive apparatus defines a hole therein, and the drive rod passes through the hole.

7. The injection molding machine of claim 3, wherein the position adjustment unit is a spring.

8. The injection molding machine of claim 1, wherein the opening is strip-shaped.

9. The injection molding machine of claim 8, wherein each of the guide protrusions has a plurality of internal screw threads, each of the first and second adjustment shafts has a plurality of external screw threads engaging with the internal screw threads of a corresponding guide protrusion, and each of the first and second adjustment shafts is capable of being rotated to drive the corresponding guide protrusion to move along the opening.

10. A moving platen for an injection molding machine, comprising:
a fixed support defining an opening in one surface thereof and comprising a first adjustment motor, a second adjustment motor, a first adjustment shaft, and a second adjustment shaft, the first and second adjustment motors opposite to each other, the first adjustment motor connected to the first adjustment shaft, the second adjustment motor connected to the second adjustment shaft;
a drive apparatus; and
an ejector assembly positioned in the fixed support, the ejector assembly comprising two guide shells, two drive shafts, two ejector pins and two guide protrusions, each guide shell receiving a corresponding drive shaft and a corresponding ejector pin, the drive shafts passing through the opening and engaging with the ejector pins correspondingly, each of the drive shafts capable of being driven by the drive apparatus to move a corresponding ejector pin back and forth, each guide protrusion extending outwards from a corresponding guide shell, each of the first and second adjustment shafts engaging with a corresponding guide protrusion and driving the corresponding guide protrusion to move along the opening.

11. The moving platen of claim 10, wherein each ejector pin has a plurality of internal screw threads, one end of each drive shaft extends out of the fixed support through the opening, the other end of each drive shaft has a plurality of external screw threads engaging with the internal screw threads of a corresponding ejector pin, and the drive shaft is capable of being rotated by the drive apparatus to drive the corresponding ejector pin to move back and forth.

12. The moving platen of claim 11, wherein the ejector assembly further comprises two first pulleys, the drive apparatus comprises a motor, the motor comprises a second pulley and a drive rod, the first pulleys are mounted on the drive shafts respectively, the drive rod is connected to the motor, the second pulley is mounted on the drive rod, and the first and second pulleys are connected to each other through a belt.

13. The moving platen of claim 10, wherein the drive apparatus comprises a motor and a position adjustment unit, and the position adjustment unit supports the motor and adjusts a position of the motor according to the positions of the two ejector pins.

14. A moving platen for an injection molding machine, comprising:
a fixed support defining an opening in one surface thereof;
a drive apparatus; and
an ejector assembly positioned in the fixed support, the ejector assembly comprising two ejector pins and two drive shafts, the drive shafts passing through the opening and engaging with the ejector pins respectively, and each of the drive shafts driven by the drive apparatus to move a corresponding ejector pin back and forth;
wherein a distance between the two ejector pins is adjustable by moving one or both of the two drive shafts along the opening.

15. The moving platen of claim 14, wherein the fixed support comprises two adjustment shafts, with axis directions of the two adjustment shafts parallel with each other, the ejector assembly further comprises two guide shells and two guide protrusions, with axis directions of the two drive shafts parallel with each other, and the axis directions of the two drive shafts orthogonal to the axis directions of the two adjustment shafts, each guide shell receives a corresponding drive shaft and a corresponding ejector pin, each guide protrusion extends outwards from a corresponding guide shell, and each adjustment shaft engages with a corresponding guide protrusion; and each drive shaft moves along the opening when a corresponding adjustment shaft is operated to make a corresponding guide shell move towards the other guide shell, such that the distance between the two ejector pins is adjusted.

16. The moving platen of claim 15, wherein the fixed support further comprises two motors connected to the two adjustment shafts respectively, and the two motor drives are configured to operate the two adjustment shafts.

17. The moving platen of claim 16, wherein the drive apparatus comprises a motor and a position adjustment unit, and the position adjustment unit supports the motor and adjusts a position of the motor according to the distance between the two ejector pins.

18. The moving platen of claim 17, wherein the ejector assembly further comprises two first pulleys, the motor of the drive apparatus comprises a second pulley and a drive rod, the first pulleys are mounted on the drive shafts respectively, the drive rod is connected to the motor, the second pulley is mounted on the drive rod, and the first and second pulleys are connected to each other through a belt.

19. The moving platen of claim 17, wherein the position adjustment unit comprises a spring configured to support the motor of the drive apparatus and adjust a position of the motor of the drive apparatus according to the distance between the two ejector pins.

\* \* \* \* \*